UNITED STATES PATENT OFFICE.

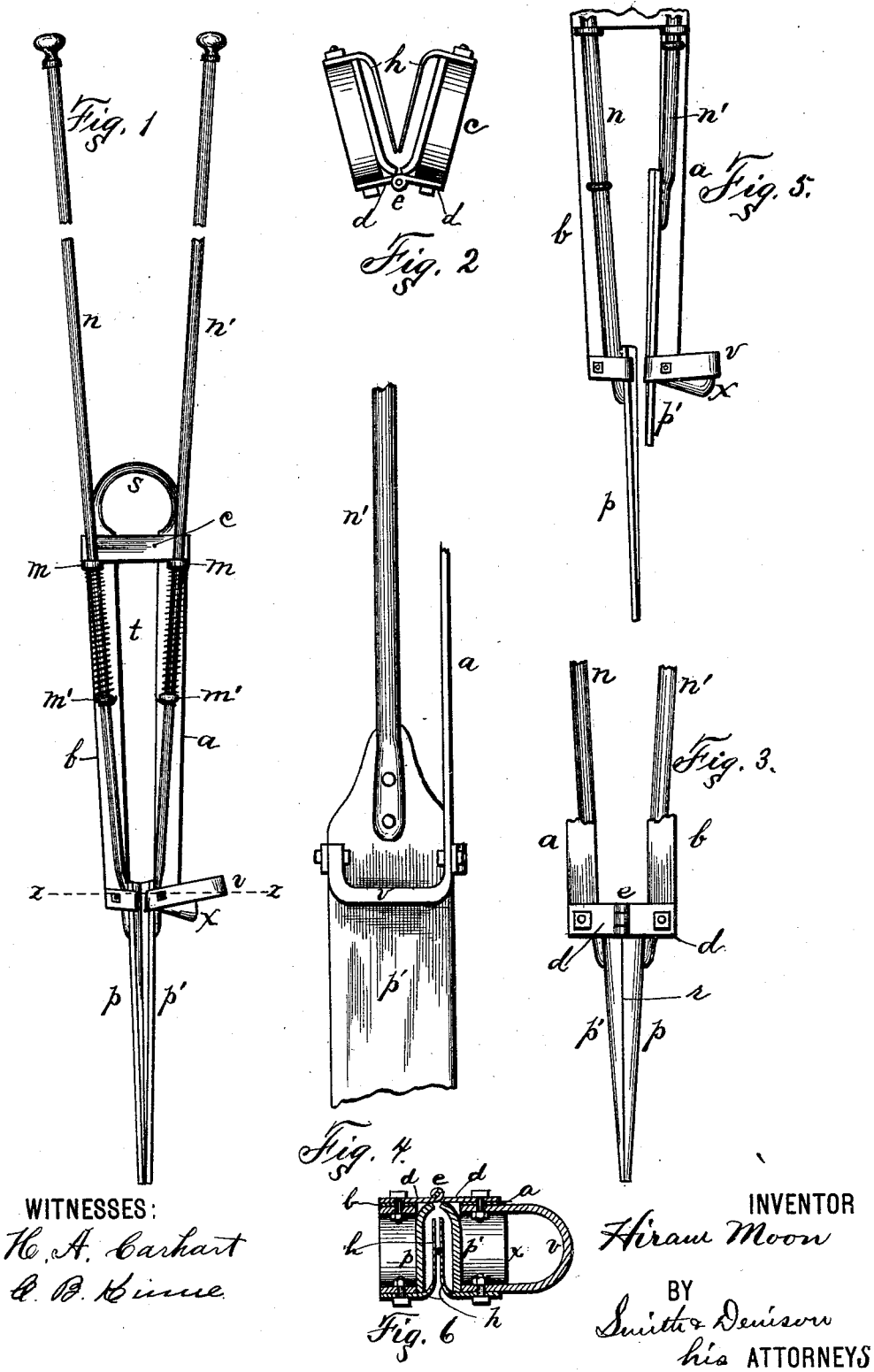

HIRAM MOON, OF RED CREEK, NEW YORK.

TRANSPLANTER.

SPECIFICATION forming part of Letters Patent No. 482,314, dated September 6, 1892.

Application filed July 30, 1891. Serial No. 401,183. (No model.)

*To all whom it may concern:*

Be it known that I, HIRAM MOON, of Red Creek, in the county of Cayuga, in the State of New York, have invented new and useful Improvements in Transplanters, of which the following, taken in connection with the accompanying drawings, is a full, clear, and exact description.

My invention relates to transplanters, and particularly to that class which are carried by the operator and operated by hand.

My object is to produce a transplanter comprising two handles mounted in a frame, a point upon each handle, between which points the plant is placed and wholly or partially inclosed, a foot-piece, and a packing-block, said points and handles being adapted to slide in the frame, and the frame being made in sections hinged together on one side, so that one side or edge of the points can be opened by squeezing the handles together, so as to receive the plant and then close upon it to hold it while the points are pushed into the soil.

My invention consists in the several novel features of construction and operation hereinafter described, and which are specifically set forth in the claims hereunto annexed. It is constructed as follows, reference being had to the accompanying drawings, in which—

Figure 1 is a front elevation of the transplanter closed. Fig. 2 is an end elevation of the same opened to receive the plant. Fig. 3 is a rear elevation of the lower part of the same closed. Fig. 4 is a side elevation of Fig. 3. Fig. 5 is a front elevation of the lower part, showing one handle and point raised. Fig. 6 is a transverse section on line $z\, z$, Fig. 1.

The frame consists of two bars $a\, b$, united rigidly at their upper ends by the cross-bar $c$ and at their lower ends by a sectional bar $d$, the sections of which are connected by a hinge $e$, and being also provided with the springs $h$, which extend down between the sections. The bars $a\, b$ are flat springs. Guides $m$ are secured upon these bars $a\, b$, and the handles $n\, n'$ pass freely through them, and $m'$ are collars on said handles. Points $p\, p'$ are secured upon the lower ends of the handles and lie as to one edge under the springs $h$. Their other or rear edges are bent inwardly toward each other, more or less, as at $r$, so as to create a sort of box to receive the plant and catch it to prevent it from falling through. A ring $s$ may be secured to the cross-bar $c$, and retracting-springs $t$ may also be used, mounted upon the handles between the guides $m$.

When it is desired to use the device, I open the points on one side by squeezing the handles together, swinging the frame-sections upon the hinge, and creating a torsion upon the spring-bars, the points opening as in Fig. 2. Then the plant is dropped in and the spring action of the bars automatically closes the points together, gripping or wholly or partially inclosing it, according to the degree of concavity of said points, between the springs $h$, which prevent it from slipping. These springs are of light tension, so that they will not pinch or damage the stem of the plant or its leaves. Then I push the points into the ground to the desired depth, place one foot upon the step $v$, which is carried by one part of the frame and one of the inner ends of which may form one of the springs $h$, and then either with or without slightly opening the points I pull up first one point and then the other, leaving the plant in the soil, and the block $x$, secured to or forming the lower side of the step, will pack the earth around the plant. This block is preferably made to slant downward and outward in order to produce more of an inward wedging of the earth toward the plant.

I do not limit myself to the degree of concavity of the points, nor to the precise form of points shown, inasmuch as I must vary the concavity for some plants, or can curve both edges inward instead of one, and I can also vary the form of the packing-block if I desire.

What I claim as my invention, and desire to secure by Letters Patent, is—

1. The combination, with the spring frame-bars hinged together at one end, of the handles adapted to slide thereon and the points upon the handles adapted to be opened by squeezing the handles together.

2. The combination, with the spring-bars hinged together at one end, of the handles mounted and adapted to slide thereon and the concaved points upon the handles adapted to be opened by squeezing the handles together.

3. The combination, with the frame and the handles mounted thereon and the points, of the grip-springs mounted upon the frame and projecting backward between the points.

In witness whereof I have hereunto set my hand this 14th day of July, 1891.

HIRAM MOON.

In presence of—
C. W. SMITH,
HOWARD P. DENISON.